(12) United States Patent
Xu

(10) Patent No.: US 12,295,375 B1
(45) Date of Patent: May 13, 2025

(54) MEAT SHREDDER

(71) Applicant: Shen Zhen Yousheng Electrical Appliance Co., Ltd., Guangdong (CN)

(72) Inventor: Kaiyou Xu, Guangdong (CN)

( * ) Notice: Subject to any disclaimer, the term of this patent is extended or adjusted under 35 U.S.C. 154(b) by 0 days.

(21) Appl. No.: 19/016,633

(22) Filed: Jan. 10, 2025

(51) Int. Cl.
*A22C 17/00* (2006.01)
(52) U.S. Cl.
CPC .................. *A22C 17/0026* (2013.01)
(58) Field of Classification Search
CPC .. A22C 17/0026; A22C 17/0006; B02C 19/22
See application file for complete search history.

(56) References Cited

U.S. PATENT DOCUMENTS 4,181,265 A * 1/1980 Young ............... B02C 19/22
241/257.1

FOREIGN PATENT DOCUMENTS

CN 104383983 A * 3/2015
CN 107971075 A * 5/2018

OTHER PUBLICATIONS

Translation of CN-107971075.*
Translation of CN-104383983.*

* cited by examiner

*Primary Examiner* — Bobby Yeonjin Kim

(57) ABSTRACT

A meat shredder comprises a main cylinder, a driving body and a shredding mechanism; the shredding mechanism is installed in an interior of the main cylinder and driven by the driving body; the shredding mechanism comprises a main rod body, and an outside of the main rod body is fixedly provided with no less than two groups of shredding rods; an outside of each shredding rod is provided with screw threads. The invention realizes that the meat placed inside the main cylinder is shred rapidly through cooperation of the shredding mechanism with the main cylinder and the driving body; the overall structure is relatively simple and the volume is small, which can well meet use of a family; the installation of shredding rods with screw threads on the main rod body of the shredding mechanism can realize that meat can be quickly broken into into shreds.

5 Claims, 5 Drawing Sheets

MEAT SHREDDER

1. TECHNICAL FIELD

Figure 1:
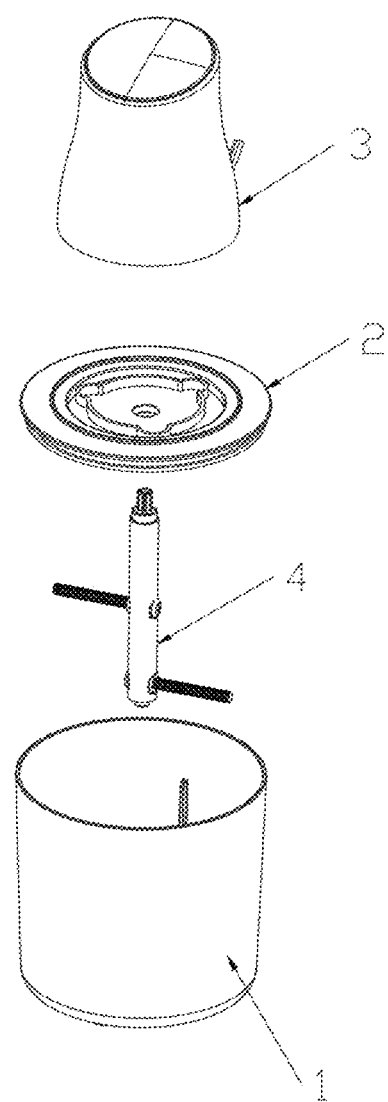

The invention relates to the technical field of food processing, in particular to a meat shredder.

2. BACKGROUND ART

A meat shredder is a mechanical device for processing meat into shredded form, which is commonly used in the food processing industry.

An existing Chinese patent with publication number CN215358831U discloses a multifunctional meat tearing and shredding machine, which belongs to the technical field of food machinery; it achieves a desirable drawing effect by setting up a first drawing roller, a second drawing roller, a third drawing roller, and a fourth drawing roller, with a high rate of drawing, and a good drawing quality, and a strengthened production capacity; a first adjusting lever, a second adjusting lever, a third adjusting lever, and a fourth adjusting lever can be adjusted according to the thickness of the shredded meat needed, and is suitable for tearing strips of a variety of meat products, such as pork, beef, chicken, rabbit, textured soybean protein and the like. However, the structure of such shredder is more complicated, and the overall volume is larger, which is highly inconvenient for a single family to use.

So, in view of this, with the aim of improving the existing structure and shortcomings, the invention provides a meat shredder to achieve a more practical value.

3. SUMMARY OF THE INVENTION

In order to solve the above technical problems, the invention provides a meat shredder, realized by the following specific technical means:

A meat shredder comprises a main cylinder, a driving body and a shredding mechanism; the shredding mechanism is installed in an interior of the main cylinder and driven by the driving body; the shredding mechanism comprises a main rod body, and an outside of the main rod body is fixedly provided with no less than two groups of shredding rods; an outside of each shredding rod is provided with screw threads.

Further, there is a plurality of mounting through holes on an outside of the main rod body corresponding to the shredding rods; one end of each shredding rod is provided with a limit flange, an other end of each shredding rod passes through the mounting through holes and is threadedly connected with a fastening nut, and the fastening nut is tightly connected with the main rod body.

Further, a plurality of mounting holes are provided on an outer side of the main rod body corresponding to the shredding rods, and the main rod body is fixedly connected with the mounting holes by welding.

Further, an upper connector and a lower connector are provided at upper and lower ends of the main rod body respectively.

Further, a drive motor is installed inside the driving body, and an output shaft of the drive motor is fixedly connected with a drive head that is matched and connected with the upper connector.

Further, a connection groove is provided at an inner bottom of the main cylinder, and the lower connector is rotatably mounted in the connection groove.

Further, a cover plate is mounted on a top of the main cylinder, and a through hole is provided in a center of the cover plate for the upper connector to pass through.

Compared with the prior art, the invention has the following beneficial effects:

The invention can realize that the meat placed inside the main cylinder is shred rapidly through cooperation of the shredding mechanism with the main cylinder and the driving body; in addition, the overall structure is relatively simple and the volume is small, which can well meet the use of a single family; the installation of the shredding rods with screw threads on the main rod body of the shredding mechanism can realize that, when the shredding rods rotate following rotation of the main rod body, the meat can be quickly shred and meat is broken into into shreds.

4. BRIEF DESCRIPTION OF ACCOMPANY DRAWINGS

Figure 2:
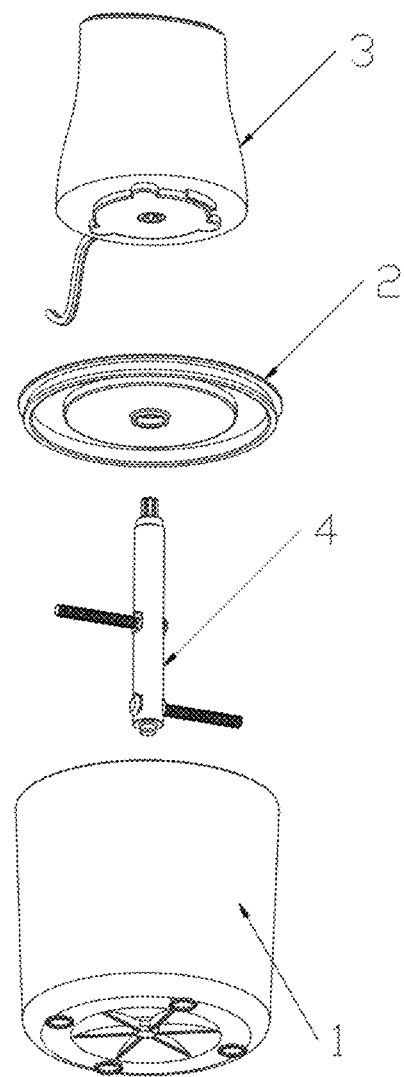
Figure 3:
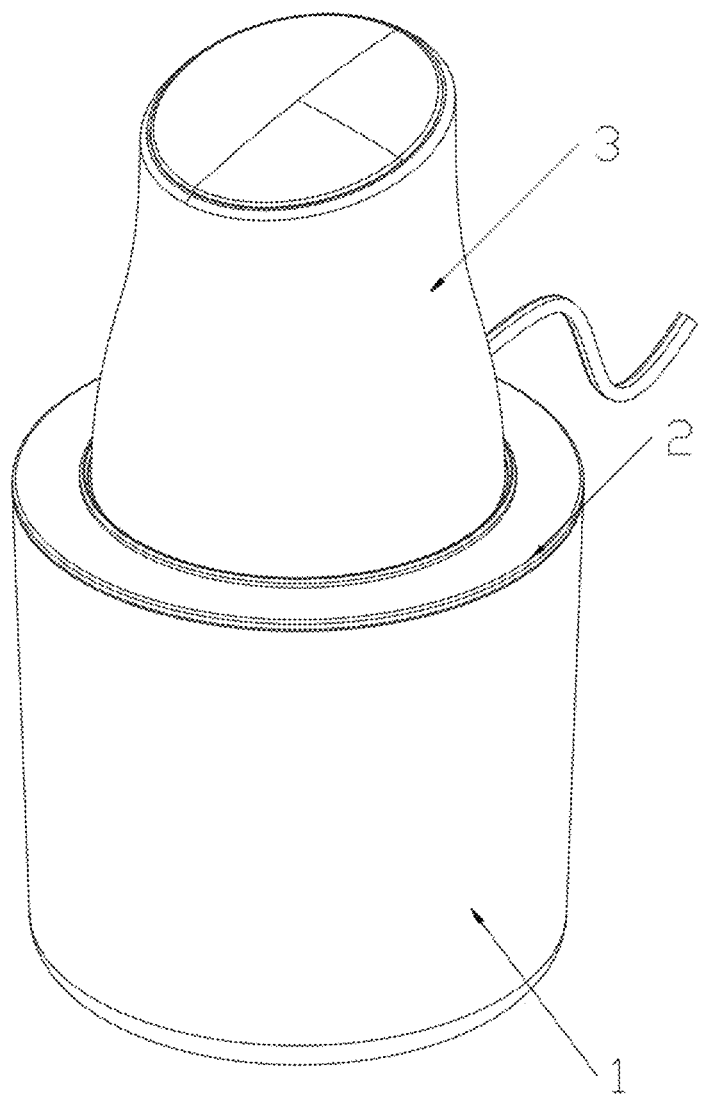
Figure 4:
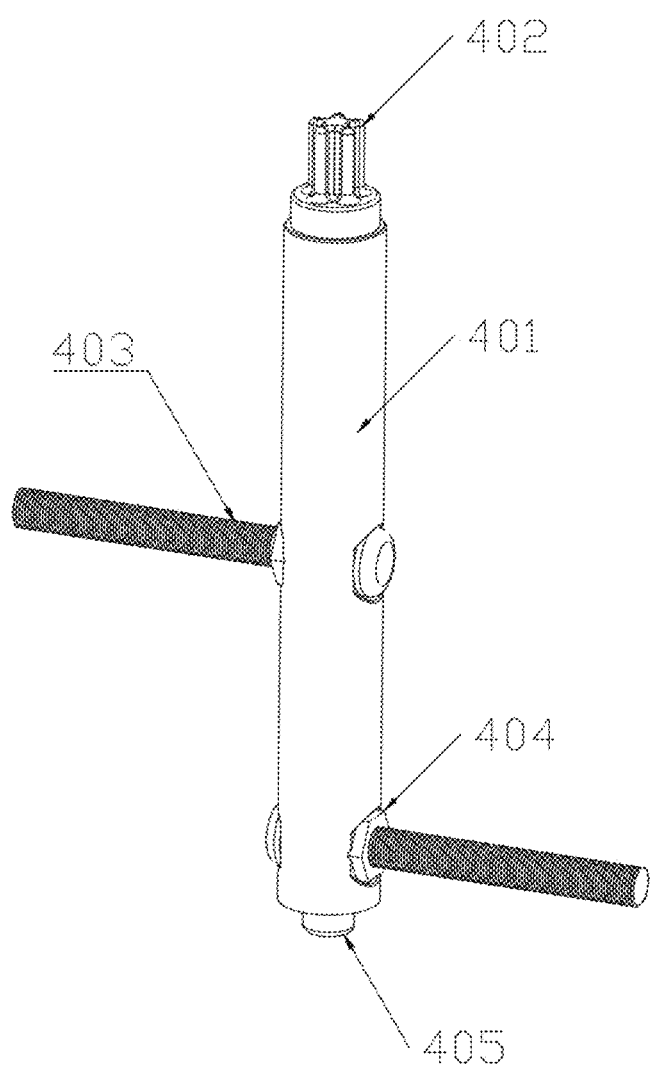
Figure 5:
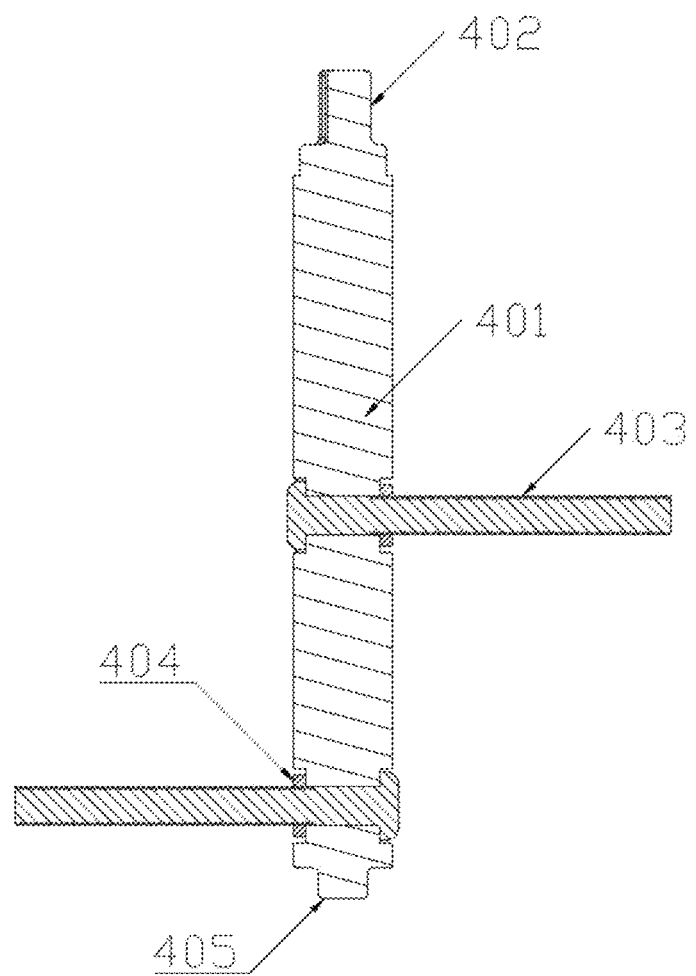

FIG. 1 is a first exploded view of the invention;
FIG. 2 is a second exploded view of the invention;
FIG. 3 is an overall structural diagram of the invention;
FIG. 4 is a three-dimensional structural diagram of the shredding mechanism of the invention;
FIG. 5 is a sectional view of the shredding mechanism of the invention.

As shown in the accompanying drawings:

1 main cylinder, 2 cover plate, 3 driving body, 4 shredding mechanism, 401 main rod body, 402 upper connector, 403 shredding rod, 404 fastening nut, 405 lower connector.

5. SPECIFIC EMBODIMENT OF THE INVENTION

The invention is further described in detail hereinafter with reference to the drawings. The following embodiments are used to illustrate the invention but cannot be used to limit the scope of the invention.

In the description of the invention, unless otherwise indicated, the term "plurality" means two or more; the terms "top", "bottom", "left", "right", "inner", "outer", "front end", "rear end", "head", "tail" and the like indicate orientation or positional relationships based on those shown in the accompanying drawings, solely for the purpose of facilitating the description of the invention and simplifying the description, the it is not intended to indicate or imply that the device or element referred to must have a particular orientation, be constructed and operated in a particular orientation, and therefore cannot be construed as a limitation of the invention. Furthermore, the terms "first", "second", "third", etc. are used for descriptive purposes only and are not to be construed as indicating or implying relative importance.

In the description of the embodiments of the invention, it should be further noted that unless otherwise explicitly stated or limited, the terms "arranged", "mounted", and "connected" should be interpreted broadly, and may be, for example, fixedly connected, detachably connected, or integrally connected; can be mechanically or electrically connected; they may be connected directly or indirectly through intervening media, or they may be interconnected between two elements. The specific meanings of the above terms in the invention can be understood by those skilled in the art according to specific situations.

Embodiment 1

With reference to FIG. 1 to FIG. 5, the invention provides a meat shredder, comprising a main cylinder 1, a driving body 3 and a shredding mechanism 4; the shredding mechanism 4 is installed in an interior of the main cylinder 1 and driven by the driving body 3; the shredding mechanism 4 comprises a main rod body 401, and an outside of the main rod body 401 is fixedly provided with no less than two groups of shredding rods 403; an outside of each shredding rod 403 is provided with screw threads.

Further, there is a plurality of mounting through holes on an outside of the main rod body 401 corresponding to the shredding rods 403; one end of each shredding rod 403 is provided with a limit flange, an other end of each shredding rod 403 passes through the mounting through holes and is threadedly connected with a fastening nut 404, and the fastening nut 404 is tightly connected with the main rod body 401 so as to complete the rapid installation and fixation of the shredding rod 403, but also to facilitate the rapid disassembly and replacement of the shredding rod 403 after the wear and tear of the shredding rod 403 in long-term operation, with high ease of use.

Wherein, an upper connector 402 and a lower connector 405 are provided at upper and lower ends of the main rod body 401 respectively.

Wherein, a drive motor is installed inside the driving body 3, and an output shaft of the drive motor is fixedly connected with a drive head that is matched and connected with the upper connector 402, so that it can quickly drive the main rod body 401 to rotate, which in turn drives the shredding rod 403 to operate.

Wherein, a connection groove is provided at an inner bottom of the main cylinder 1, and the lower connector 405 is rotatably mounted in the connection groove to ensure a high degree of stability of the main rod body 401 during rotation.

Wherein, a cover plate 2 is mounted on a top of the main cylinder 1, and a through hole is provided in a center of the cover plate 2 for the upper connector 402 to pass through so that the upper connector 402 can be quickly connected to the drive head.

The working principle of the embodiment: the embodiment can realize that the meat placed inside the main cylinder 1 is shred rapidly through cooperation of the shredding mechanism 4 with the main cylinder 1 and the driving body 3; in addition, the overall structure is relatively simple and the volume is small, which can well meet the use of a single family; the installation of the shredding rods 403 with screw threads on the main rod body 401 of the shredding mechanism 4 can realize that, when the shredding rods 403 rotate following rotation of the main rod body 401, the meat can be quickly shred and meat is broken into into shreds.

Embodiment 2

The difference of the embodiment with Embodiment 1 lies in that: a plurality of mounting holes are provided on an outer side of the main rod body 401 corresponding to the shredding rods 403, and the main rod body 401 is fixedly connected with the mounting holes by welding, to ensure that the shredding rods 403 have a high connection stability with the main rod body 401, which is conducive to long-term stable use.

The invention and its embodiments have been described above, but the description is not limited thereto; only one embodiment of the invention is shown in the drawings, and the actual structure is not limited thereto. In general, it is to be understood by those skilled in the art that non-creative design of structural forms and embodiments that are similar to the technical solutions without departing from the spirit of the invention shall all fall within the protective scope of the invention.

The invention claimed is:

1. A meat shredder, comprising a main cylinder, a driving body and a shredding mechanism; the shredding mechanism is installed in an interior of the main cylinder and driven by the driving body; the shredding mechanism comprises a main rod body, and an outside of the main rod body is fixedly provided with no less than two groups of shredding rods; an outside of each shredding rod is provided with screw threads, wherein there is a plurality of mounting through holes on an outside of the main rod body corresponding to the shredding rods; one end of each shredding rod is provided with a limit flange, an other end of each shredding rod passes through the mounting through holes and is threadedly connected with a fastening nut, and the fastening nut is tightly connected with the main rod body.

2. The meat shredder of claim 1, wherein an upper connector and a lower connector are provided at upper and lower ends of the main rod body respectively.

3. The meat shredder of claim 2, wherein a drive motor is installed inside the driving body, and an output shaft of the drive motor is fixedly connected with a drive head that is matched and connected with the upper connector.

4. The meat shredder of claim 2, wherein a connection groove is provided at an inner bottom of the main cylinder, and the lower connector is rotatably mounted in the connection groove.

5. The meat shredder of claim 2, wherein a cover plate is mounted on a top of the main cylinder, and a through hole is provided in a center of the cover plate for the upper connector to pass through.

* * * * *